United States Patent [19]

Becker et al.

[11] 4,422,905

[45] Dec. 27, 1983

[54] METHOD FOR PRODUCING SEPARATING NOZZLE ELEMENTS USED FOR SEPARATING GASEOUS OR VAPOROUS MIXTURES

[75] Inventors: Erwin-Willy Becker; Wolfgang Ehrfeld; Gunther Krieg, all of Karlsruhe; Wilhelm Bier, Eggenstein-Leopoldshafen, all of Fed. Rep. of Germany

[73] Assignee: Kernforschungszentrum Karlsruhe Gesellschaft mit beschränkter Haftung, Karlsruhe, Fed. Rep. of Germany

[21] Appl. No.: 155,652

[22] Filed: Jun. 2, 1980

[30] Foreign Application Priority Data

Jun. 2, 1979 [DE] Fed. Rep. of Germany ....... 2922642

[51] Int. Cl.³ .......................... C25D 1/02; C25D 1/20
[52] U.S. Cl. .......................................... 204/9; 204/11
[58] Field of Search ............................. 204/9, 3, 4, 11

[56] References Cited

U.S. PATENT DOCUMENTS 3,342,706 9/1967 Liben ...................................... 204/3
3,668,080 6/1972 Weber ..................................... 204/9
4,080,267 3/1978 Castellani ............................. 204/11

FOREIGN PATENT DOCUMENTS 2009265 10/1972 Fed. Rep. of Germany .
51-37618 10/1976 Japan ...................................... 204/3

OTHER PUBLICATIONS

Chemie Ing. Technik, 39 (1967) pp. 1–7.
Naturwissenschaften, 63 (1976) pp. 407–411.
Plating, Jul. 1965, pp. 673–676.

*Primary Examiner*—T. M. Tufariello
*Attorney, Agent, or Firm*—Spencer & Frank

[57] ABSTRACT

A method for producing a component of a separation element for separating a gaseous or vaporous mixture into fractions, which element is composed of a plurality of separating nozzle structures presenting passages defining mixture supply channels, separating chambers and fraction discharge channels, which method includes: forming a negative mold of the component by: providing a plate of a selected material whose ability to be removed from the plate is influenced by application of selected radiation; irradiating portions of the plate with such radiation in a pattern corresponding to the passages presented by the nozzle structure and to an extent such that material outside of the regions delimiting the passages is removable more easily than material within those regions; and removing the more easily removable material from the plate to create the negative mold of the component and forming the component by: filling the openings in the negative mold with a second material to create a solid plate-shaped member; and removing the negative mold from the plate-shaped member.

10 Claims, 6 Drawing Figures

METHOD FOR PRODUCING SEPARATING NOZZLE ELEMENTS USED FOR SEPARATING GASEOUS OR VAPOROUS MIXTURES

BACKGROUND OF THE INVENTION

The present invention relates to a method for producing components for separating nozzle elements for separating gaseous mixtures, particularly isotope mixtures, in which the components are provided with perforations serving to form gas supply channels, separating chambers and gas discharge channels.

According to gas-kinetic scaling relations, the gas pressure value producing a minimum specific energy consumption, or optimum operating pressure value, is inversely proportional to the characteristic dimensions of the separating nozzle structure, as described in Chemie Ing. Technik [Chemical Engineering Art] 39(1967), at page 4. Since the expenditures for the compressors, pipelines and valves required for this process decrease considerably with increasing gas pressure, it is desirable to make the separating nozzle structure as small as possible. Thus, a separating slit for withdrawing the heavy fraction having a width of no more than about $10\mu$ here corresponds to an inlet pressure of, e.g., 0.5 bar.

It is known to produce separating nozzles with particularly small characteristic dimensions by assembling them from a stack of mutually aligned foils each provided with a plurality of perforations formed to define the gas inlet channel, the curved nozzle, separator channels and discharge channels, as disclosed in German Auslegeschrift [Published patent application] No. 2,009,265. The perforations are preferably etched into the foils.

In the etch shaping process accepted in practice, and described, for example, in Naturwissenschaften [Natural Sciences] 63 (1976) at pages 408–409, the structural density, i.e. number of nozzles per unit area, on the foils can be increased by reducing all nozzle dimensions. However, this requires that the foil thickness by reduced simultaneously in order to retain the relative etching accuracy. Experience has shown that the optimum ratio of foil thickness to narrowest perforation width, or aspect ratio, for an etch shaping process is of the order of magnitude of unity.

With the desired inlet pressure of $\geq 0.5$ bar, the optimum foil thickness is thus $10\mu$ or less. Processing and manipulating such extremely thin foils is not easy and requires considerable manufacturing expertise. The small aspect ratio of the foils produced according to such etch shaping process, moreover, has a substantial adverse influence, manifested by stacking errors, on the output of the separating nozzle elements. This occurs because the small foil thickness dictated by the limited aspect ratio value creates the probability of large stacking errors, or offsets, per unit of slit length. There thus exists the danger that the above-mentioned advantage offered by an increase in the gas pressure would be accompanied by higher manufacturing costs and/or a reduction in the output of the separating nozzle elements.

SUMMARY OF THE INVENTION

It is the object of the present invention to provide a method for producing components for the assembly of separating nozzle elements of the above-mentioned type which makes possible a substantial increase in the aspect ratio while retaining the required small dimensions and close tolerances for the separating structure.

This and other objects are achieved, according to the invention, by a method for producing a component of a separation element for separating a gaseous or vaporous mixture into fractions, which element is composed of a plurality of separating nozzle structures presenting passages defining mixture supply channels, separating chambers and fraction discharge channels, which method includes: forming a negative mold of the component by: providing a plate of a selected material whose ability to be removed from the plate is influenced by application of selected radiation; irradiating portions of the plate with such radiation in a pattern corresponding to the passages presented by the nozzle structure and to an extent such that material outside of the regions delimiting the passages is removable more easily than material within those regions; and removing the more easily removable material from the plate to create the negative mold of the component; and forming the component by: filling the openings formed by the step of removing with a second material to create a solid plate-shaped member; and removing the negative mold from the plate-shaped member.

The invention is based on the realization that the method defined above makes possible the manufacture of negatives for the plates with substantially greater aspect ratios, while retaining the relatively close tolerances for the critical parameters which are required for gas dynamic reasons, than is permitted by the foil etching technique and that these favorable properties of the negatives can be transferred to the plates themselves practically without loss in quality when the negatives are employed as molds which are filled with positive material.

Various plastics, or resists, such as, for example, polymethylmetacrylate (PMMA), which have already found acceptance in the manufacture of microelectronic circuits, are suitable as materials for the negatives. The partial removal of material after exposure to high energy radiation can in this case be effected, for example, by dissolving out the material with methylisobutyl ketone (MIBK) or with a mixture of MIBK and isopropyl alcohol (IPA). Complete removal of the negative material is possible, for example, by the use of chlorobenzene [phenyl chloride] or acetone.

It is, however, also possible to use so-called photo shaping glass (modified lithium silicate) or Se-Ge glasses for the manufacture of the negatives in which the partial removal is effected with a diluted acid or base.

The high energy radiation may be electromagnetic waves which, in order to obtain a sufficient optical resolution, should have a wavelength of $<4000$Å. Particularly high aspect ratios can be realized with so-called soft X-rays whose wavelength lies between 1 and 100Å. Such radiation can be generated with suitable X-ray tubes, with electron synchrotrons or with a microplasm generated by a giant pulsed laser. When an electron synchrotron is used, a particularly good collimation can be obtained for the radiation with sufficient intensity, thus permitting the creation of a particularly high aspect ratio.

While the use of electromagnetic radiation for the production of the desired structures requires the known use of masks, high energy corpuscular radiation, particularly electron radiation, permits the production of the structures in the negative material also by means of electromagnetic control.

In order to fill the negative molds with positive material, they may be placed onto a carrier which covers one side of the negative molds. If the perforations in the plates to be produced are to have only very small, or no, spatial interconnection, it may be advisable, or even necessary, to combine one side of the negative material for producing the negative molds with a carrier material even before it is processed, thus forming a compound plate from which the carrier material is removed again after the negative molds have been filled.

In cases where the influence of the carrier material would produce interference during the partial irradiation of the negative material, for example, because it would reflect part of the radiation, it may be of advantage to combine the plate-shaped negative material with the carrier material only after the partial irradiation but before the partial removal.

The filling of the negative molds with positive material can be effected in various ways; for example, by chemical deposition, vapor deposition or sputtering. The process according to the present invention can be applied with particularly good technical and economical success if an electrical nonconductor of the above-mentioned type is used as the negative material, an electrical conductor is used as the carrier material, and the negative molds are filled with positive material by electrochemically depositing a metal constituting the positive material.

DESCRIPTION OF THE PREFERRED EMBODIMENTS

Figure 1:
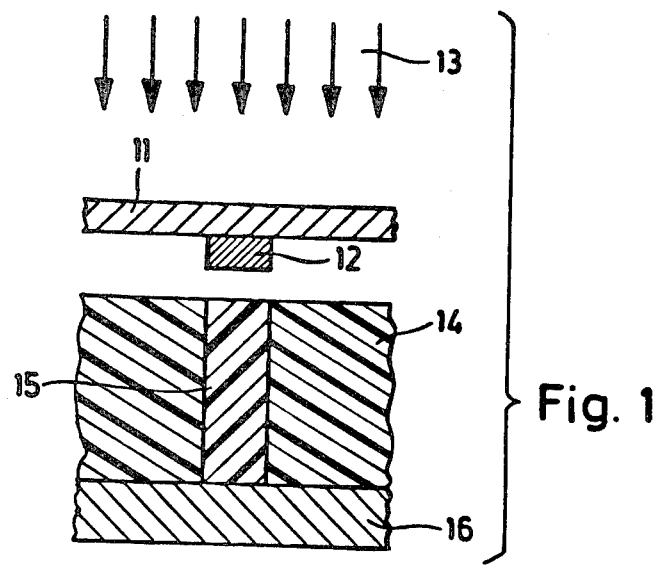
FIGS. 1 to 4 are schematic cross-sectional views illustrating successive stages in a process according to a preferred embodiment of the invention.

FIG. 1 depicts a first stage in the fabrication of a mold in which a mask composed of a carrier 11 which only weakly absorbs selected radiation has applied thereto structures 12 which greatly absorb the radiation. This mask is placed above a plate-shaped body of a material which is rendered soluble when sufficiently irradiated by the selected radiation. When such radiation, which is preferably collimated, is directed, as represented by arrows 13, through carrier 11, the regions 14 of the radiation-sensitive negative material are made soluble by the irradiation while the areas 15 form the regions of the negative material which has not been reached by the radiation and thus has remained insoluble. The plate-shaped negative material 14 and 15 is mounted upon and connected to an electrically conductive base plate 16 whose properties are not altered by the radiation.

Figure 2:
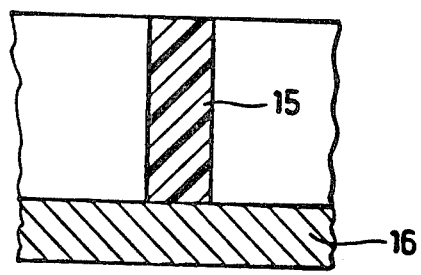

After irradiation of portions of the body of negative material as shown in FIG. 1, the irradiated regions 14 are dissolved away so that a negative mold is produced which, as shown in FIG. 2, includes the nonirradiated areas 15 and the substrate 16.

Figure 3:
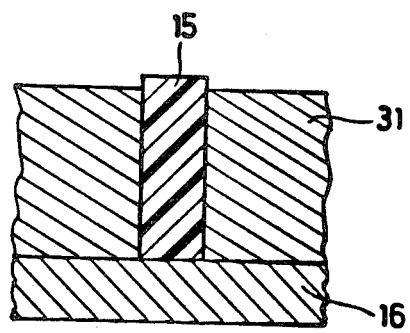
Figure 4:
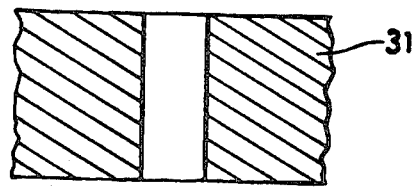

In FIG. 3, the negative mold of FIG. 2 has been filled by electrochemically depositing metal 31 onto the substrate 16. FIG. 4 shows a finished plate 31 after removal of the nonirradiated negative material 15 and the substrate 16.

Figure 5:
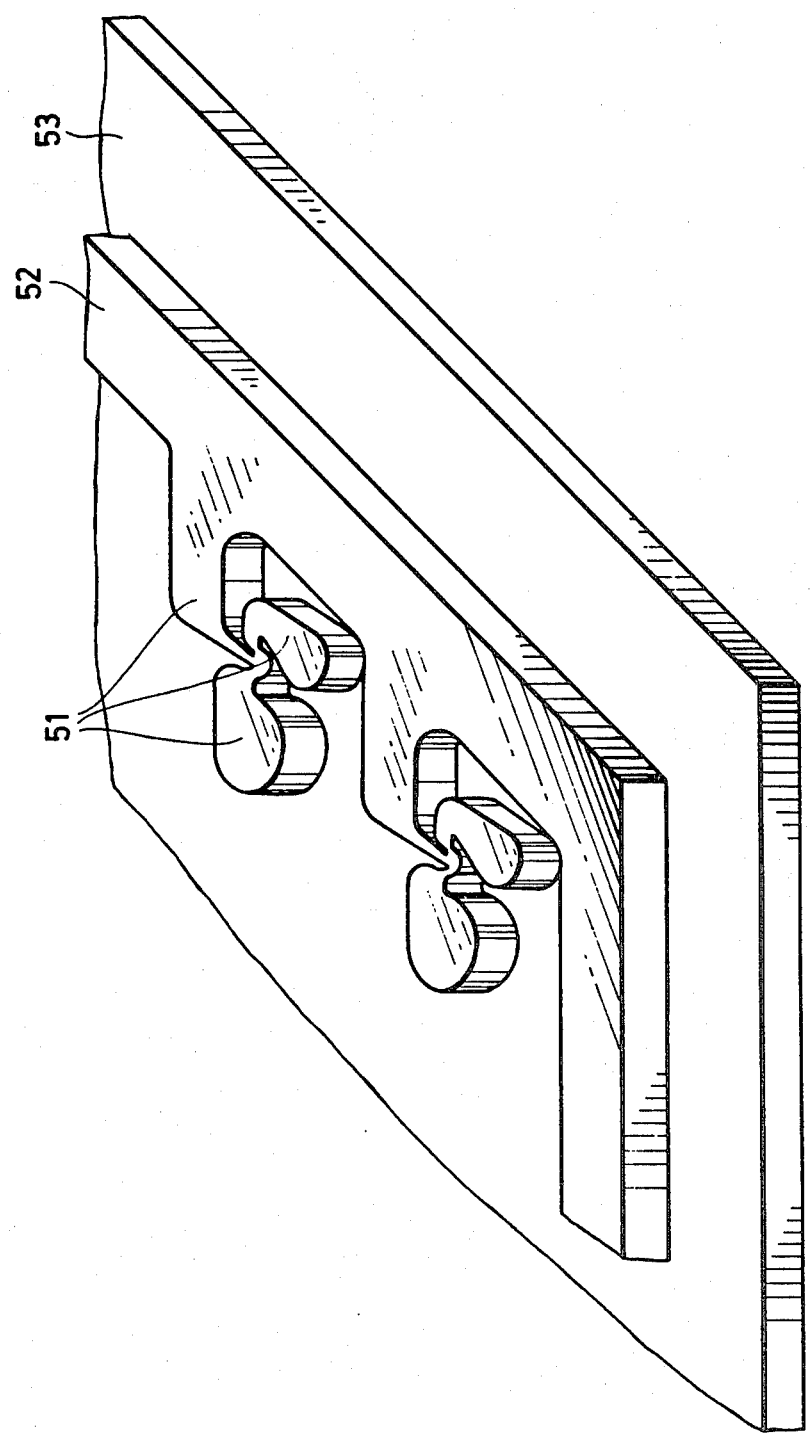
FIG. 5 is a perspective view of a section of a negative mold of a separating structure produced by the process depicted in FIGS. 1 and 2.

An example of part of a negative mold according to the process step of FIG. 2 is shown in FIG. 5 and includes a plate-shaped part presenting structures 51 defining the gas supply channels, separating chambers and gas discharge channels of nozzle elements, and a frame 52 connected therewith, as well as a carrier plate 53 on which the plate-shaped part is mounted.

Figure 6:
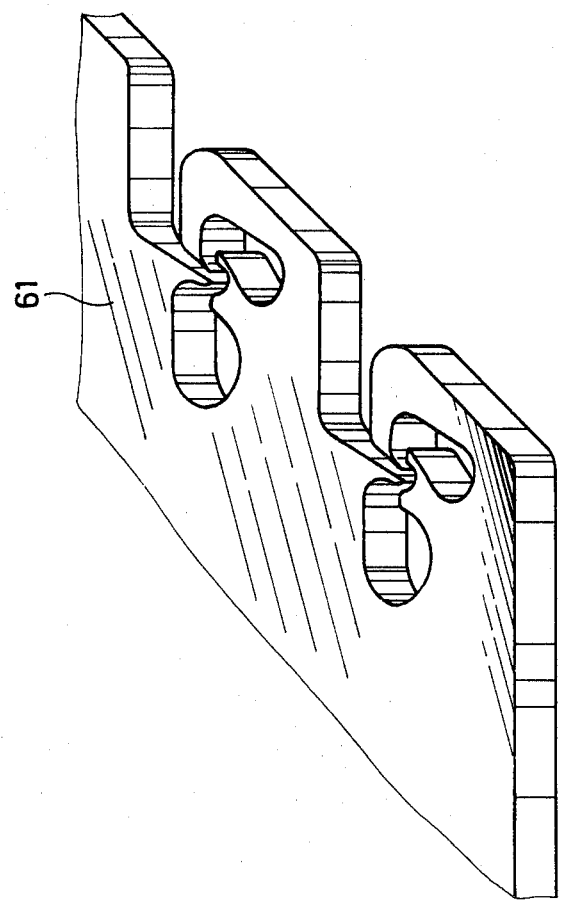
FIG. 6 is a perspective view of a section of a finished nozzle element component in the form of a plate produced from the negative mold of FIG. 5.

FIG. 6 shows the finished nozzle element plate 61 produced by the process step of FIG. 4.

For producing extremely small perforations, polymethylmetacrylate is used as the negative material. In this case, the radiation is composed of soft X-rays which are produced preferably by means of an electron synchrotron or an electron storage ring. The energy of the electrons in the synchrotron or the electron storage ring which might be equipped with wigglers or undulators is in the order of 0.5 to 5 GeV, the wavelength of the emitted radiation which is used for irradiating the negative material is in the order of 1 to 100Å. To permit a selective removal of the irradiated regions the amount of radiation which must be applied is in the order of 10 $J/cm^3$. The irradiated regions of the negative material are removed by dissolving out the irradiated material with a mixture of MIBK and IPA. The negative mold of the component has an aspect ratio in the order of 10. The openings formed in this way are filled with nickel which is electrodeposited from a nickelsulfamate solution. The remaining PMMA regions are then dissolved in acetone, the carrier material is dissolved in an anorganic acid. The thickness level of finished plate is in order of 10 to 100 $\mu$m.

For producing plate-shaped components of a separation element with larger perforations, conventional photosensitive resists, e.g. diazo-resists, are used. The resist material is irradiated with UV-radiation generated by a Hg-lamp. It should be emphasized that two types of resists might be used in the manufacturing process. In the case of type 1, the irradiated regions are easily dissolved in the organic solvent and the negative mold is created by the non-irradiated regions. In the case of type 2, the solubility is strongly reduced by means of the irradiation and the negative mold is created by the irradiated regions. In both cases, the negative mold is filled up with nickel as described above.

It will be understood that the above description of the present invention is susceptible to various modifications, changes and adaptations, and the same are intended to be comprehended within the meaning and range of equivalents of the appended claims.

What is claimed is:

1. A method for producing a component of a separation element for separating a gaseous or vaporous mixture into fractions, which element is composed of a plurality of separating nozzle structures presenting passages defining mixture supply channels, separating chambers and fraction discharge channels, said method comprising:
    forming a negative mold of the component by: providing a layer of a selectively electrically nonconductive material whose ability to be removed is influenced by application of selected radiation and mounting such layer on a substrate of an electrically conductive material; irradiating portions of the layer with such radiation in a pattern corresponding to the passages presented by the nozzle structure and to an extent such that material outside of the regions delimiting the passages is removable more easily than material within those regions; and removing the more easily removable material from the layer to create the negative mold of the component; and forming the component by: filling the openings formed by said step of removing with a second material, which is a metal, by electrochemical deposition to create a solid plate-shaped member; removing the negative mold from the plate-shaped member; and removing the substrate after said step of filling.

2. Method as defined in claim 1 wherein the radiation employed in said step of irradiating is high energy radiation having a wavelength of less than 4000Å.

3. Method as defined in claim 2 wherein the radiation is composed of soft X-rays.

4. Method as defined in claim 1 wherein the radiation employed in said step of irradiation is high energy corpuscular radiation.

5. Method as defined in claim 4 wherein the corpuscular radiation is electron radiation.

6. A method for producing a component of a separation element for separating a gaseous or vaporous mixtures into fractions, which element is composed of a plurality of separating nozzle structures presenting passages defining mixture supply channels, separating chambers and fraction discharge channels, said method comprising:

forming a negative mold of the component by: providing a layer of a selected electrically nonconductive material whose ability to be removed is influenced by application of selected radiation; irradiating portions of the layer with such radiation in a pattern corresponding to the passages presented by the nozzle structure and to an extent such that material outside of the regions delimiting the passages is removable more easily than material within those regions; mounting the layer of a selected material on a substrate of an electrically conductive material after said step of irradiating; and removing the more easily removable material from the layer after said step of mounting to create the negative mold of the component; and forming the component by: filling the openings formed by said step of removing with a second material, which is a metal, by electrochemical deposition to create a solid plate-shaped member; removing the negative mold from the plate-shaped member; and removing the substrate after said step of filling.

7. Method as defined in claim 6, wherein the radiation employed in said step of irradiating is high energy radiation having a wavelength of less than 4000Å.

8. Method as defined in claim 6, wherein the radiation is composed of soft X-rays.

9. Method as defined in claim 6, wherein the radiation employed in said step of irradiating is high energy corpuscular radiation.

10. Method as defined in claim 9, wherein the corpuscular radiation is electron radiation.

* * * * *